United States Patent [19]

Kincaid

[11] Patent Number: 4,695,096
[45] Date of Patent: Sep. 22, 1987

[54] MOTORCYCLE PASSENGER ARM REST

[76] Inventor: Donald M. Kincaid, R.R. #2, Claremont, Ill. 62421

[21] Appl. No.: 933,579

[22] Filed: Nov. 20, 1986

[51] Int. Cl.⁴ ............................................. A47C 7/54
[52] U.S. Cl. ................................ 297/417; 297/DIG. 9
[58] Field of Search .................. 297/417, 349, DIG. 9

[56] References Cited

U.S. PATENT DOCUMENTS

| 1,378,704 | 5/1921 | McPartland | 297/417 X |
| 2,592,702 | 4/1952 | Sprung | 297/417 |
| 3,857,605 | 12/1974 | Fantoni | 297/417 X |
| 3,950,027 | 4/1976 | Wilson | 297/417 X |
| 3,951,452 | 4/1976 | Harder, Jr. | 297/417 |
| 4,225,183 | 9/1980 | Hanagen et al. | 297/417 |
| 4,270,798 | 6/1981 | Harder, Jr. | 297/417 |
| 4,549,629 | 10/1985 | Komuro | 297/417 X |

Primary Examiner—Francis K. Zugel
Attorney, Agent, or Firm—John Gibson Semmes

[57] ABSTRACT

Motorcycle passenger armrest characterized by its swingable relation to vehicular passenger seat, there being a passenger release mechanism which permits passenger access in mounting and dismounting or during storage and operational modes. The armrest is secured against displacement by an angularly disposed mounting base, the anchor of which provides vertical and horizontal stays to secure to the motorcycle frame itself.

2 Claims, 3 Drawing Figures

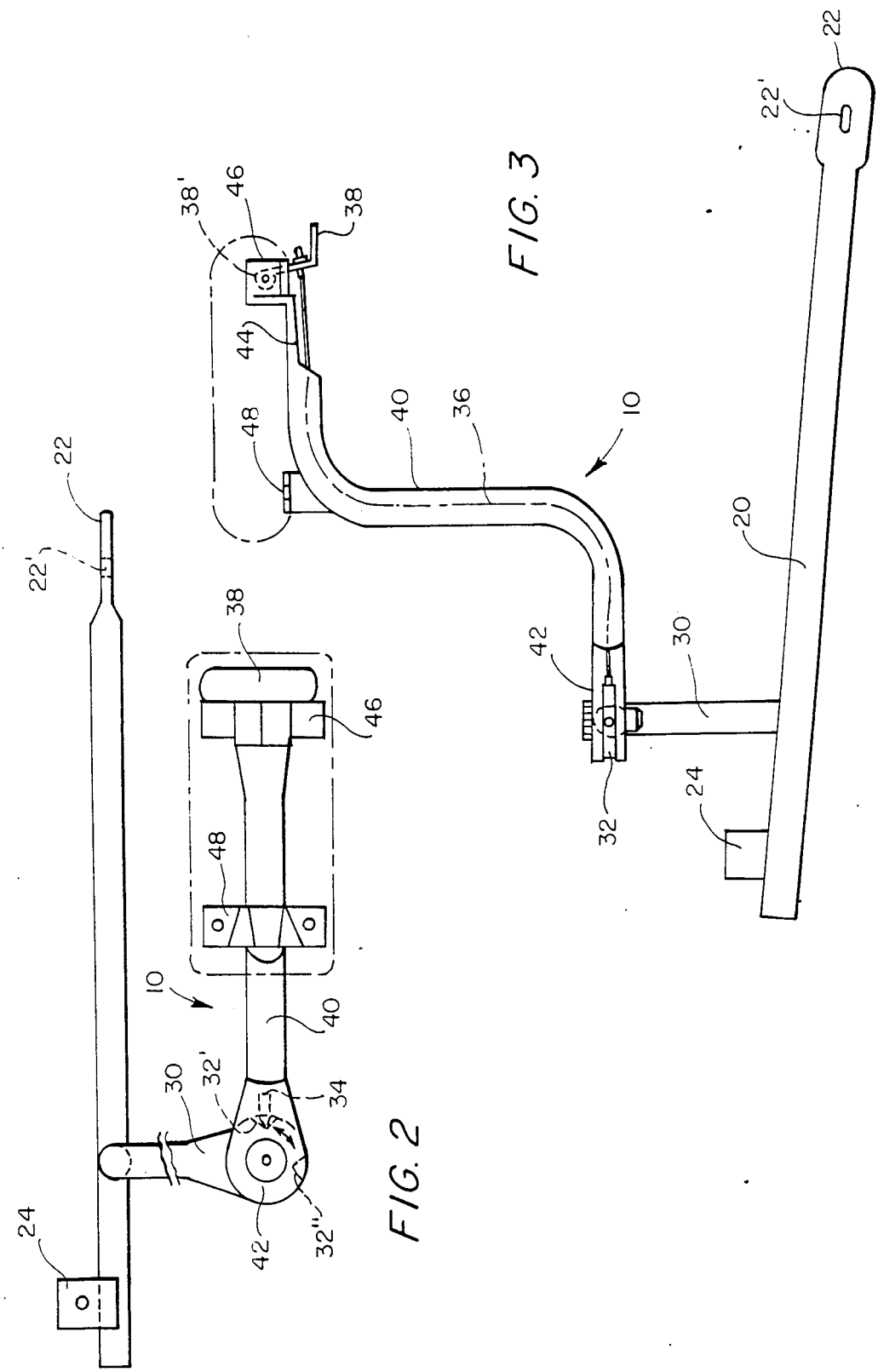

MOTORCYCLE PASSENGER ARM REST

BACKGROUND OF THE INVENTION

1. Field of the Invention

Whereas this invention is defined with respect to motorcycle passenger comfort and convenience, it will be apparent that the invention may be applied to numerous other similar vehicular and non-vehicular adaptations. It is primarily adapted to its adjustable position on the two-seated motorcycle, operationaly adjacent the passenger seat and it is designed to be secured in direct connection with the motorcycle frame elements as will be more apparent from reference to the ensuing description.

2. Prior Art

The following prior art patents best represent the known state of development.

U.S. Pat. No. 3,565,484—J. A. Gargelo—dated Feb. 23, 1971.

U.S. Pat. No. 3,829,159—Dennis F. Leffler—dated Aug. 13, 1974.

U.S. Pat. No. 4,205,879—Dennis H. Heling—dated June 3, 1980.

U.S. Pat. No. 4,277,102—Arne Aaras et. al.—dated July 7, 1981.

U.S. Pat. No. 4,438,975—Ralph J. Williams—dated Mar. 27, 1984.

In none of the aforesaid, taken singly or in combination does one find the coactive construction of the present invention, wherein means are provided for fingertip control of the swingable relation of the arm rest to the vehicular seat of the passenger. This control permits both portability and operational modes to be employed without knock down, and also insures accessibility of the passenger before and during vehicular operation.

DESCRIPTION OF THE DRAWINGS

FIG. 2 is a plan view of the invention apparatus of FIG. 1.

FIG. 3 is a view in side elevation of the arm rest, disassociated from the vehicle.

DESCRIPTION OF PREFERRED EMBODIMENTS

Figure 1:
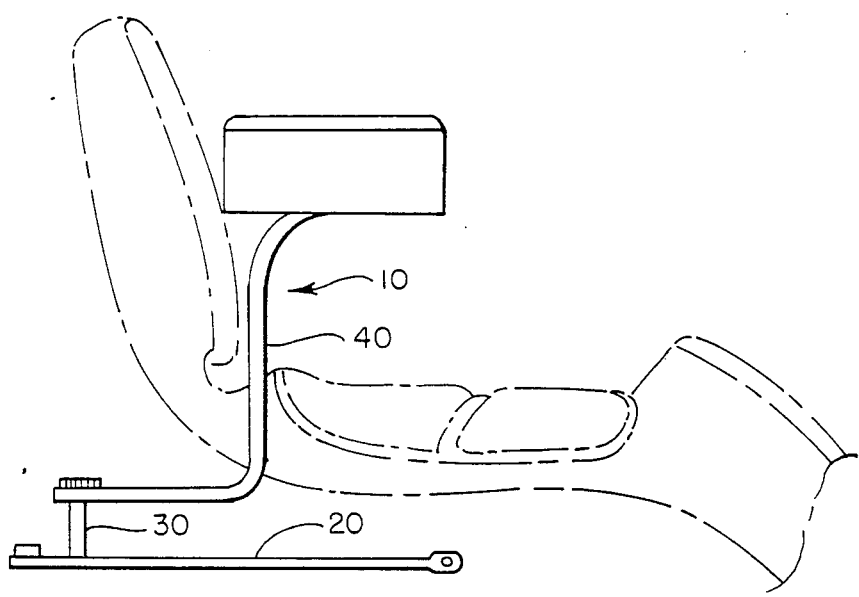
FIG. 1 shows the invention in side view, operationally disposed with respect to the vehicular passenger seat.

In FIG. 1 the motorcycle passenger arm rest 10 is shown, relative to a characteristic luxury cycle. The armrest is disposed in operational, forward position, by means of passenger adjustment as will be more fully described hereinafter. In FIG. 2 the armrest is shown to be mounted upon the mounting base 20, the latter including vertical and horizontal extensions 22 and 24, respectively for fixing the invention device to the motorcycle vehicular frame. The upright connector pole 30 is fixed at right angle to mounting base 20. The pole 30 at its upper free end defines a fixed detent plate 32, adapted to engagement by the spring loaded detent pin 34, the detent pin having cable connection 36 with the actuator 38, mounted in the swing rest mount hereinafter defined. The detent pin is actually a safety shear pin. The detent receptacles 32' and 32" of the plate 32 are set 90 degrees apart to permit a 90 degree swing-out and lock, upon spring-loaded extraction of the pin 34 from corresponding fixed disk 32. See detents 34' and 34" in FIG. 2. The swing rest mount 40 is formed with interconnected elbows; one free end 42 thereof being bifurcated to accommodate and fit over the circular detent plate 32. For the swing rest mount, a suitable cap set screw fits into the end 42 and seats in the pole 30. At its opposite end 44 the mount 40 defines a small housing 46 for both the element handle 38 and its accompanying axle pin 38, the handle being spring-loaded and mounted thereon. The elements 46 and 48 provide a support for the arm rest cushion, per se.

Lateral and vertical stability to the invention is insured by the opposed angular relation of mounting base fixture elements 22 and 24. The mounting base 20 is angularly disposed with respect to the horizontal so as to accommodate the invention to the angular disposition of motorcycle fore and aft frame and fender elements. Note that the elements 22 and 24 lie not only on different planes, but also adapt the mounting base 20 to horizontal, 24 and vertical, 22 anchoring. Safety, permitting swing-out of the device, is insured by providing shear pin 34 whereby and upon receiving a substantial blow, the armrest will swing free and permit the passenger to escape by opening up an escape route.

Having defined the invention with reference to specific drawings, the scope thereof is set forth in the appended claims.

I claim:

1. In combination with a motorcycle rear passenger seat, the improvement of an horizontally swingable armrest which comprises:
   (A) an elongated mounting base which defines plural spaced-apart forward and rearward anchors, the said mounting base being set upon the motorcycle at a rearwardly ascending angle from the horizontal;
   (B) an upright connector, fixed at one end to the mounting base adjacent the said rearward anchor, said connector having an inwardly offset extension adjacent a free end of the connector, a free end of the extension defining a detent plate, each said offset extension and detent plate being disposed beneath the passenger seat;
   (C) a swing rest mount engaging the free end of the upright connector in horizontally moveable relation to the connector and detent plate, the swing rest mount having a spring-loaded detent pin at the lower end and a spring-loaded lock pin release handle and cable, interconnecting the upper end of the swing rest mount and detent pin, the cable being slideably moveable within the swing rest mount, whereby to provide for alternately setting and releasing the detent pin, relative to the detent plate, the swing rest mount further supporting an armrest cushion adjacent its upper end.

2. The armrest of claim 1 wherein the detent pin of the swing rest mount is a shear pin which is frangible upon a predetermined set load being applied to the armrest, to free said armrest for horizontally swingable movement, relative to the motorcycle rear passenger seat.

* * * * *